US006715669B2

(12) United States Patent
Hara

(10) Patent No.: US 6,715,669 B2
(45) Date of Patent: Apr. 6, 2004

(54) DELIVERY BOX CAPABLE OF HANDLING REGISTERED MAILS

(75) Inventor: Kouichiro Hara, Tokyo (JP)

(73) Assignee: Kabushiki Kaisha Fulltime System, Tokyo (JP)

( * ) Notice: Subject to any disclaimer, the term of this patent is extended or adjusted under 35 U.S.C. 154(b) by 0 days.

(21) Appl. No.: 09/809,190

(22) Filed: Mar. 16, 2001

(65) Prior Publication Data

US 2002/0130172 A1 Sep. 19, 2002

(51) Int. Cl.[7] .............................................. B65G 11/04
(52) U.S. Cl. .......................... 232/45; 232/19; 340/5.73
(58) Field of Search ............................ 232/19, 24, 25, 232/17, 45; 340/5.73, 5.8, 5.86

(56) References Cited

U.S. PATENT DOCUMENTS

| | | | | | |
|---|---|---|---|---|---|
| 693,770 | A | * | 2/1902 | Wright et al. | 232/17 |
| 4,894,717 | A | | 1/1990 | Komei | |
| 5,172,970 | A | * | 12/1992 | Momose et al. | 312/329 |
| 5,223,829 | A | * | 6/1993 | Watabe | 340/5.73 |
| 5,231,272 | A | * | 7/1993 | Mardon | 235/382 |
| 5,369,221 | A | * | 11/1994 | Ramsden | 177/25.15 |
| 5,386,462 | A | * | 1/1995 | Schlamp | 379/93.12 |
| 5,475,378 | A | * | 12/1995 | Kaarsoo et al. | 340/5.6 |
| 5,774,053 | A | * | 6/1998 | Porter | 340/568.1 |
| 5,979,750 | A | * | 11/1999 | Kindell | 232/19 |
| 6,010,064 | A | * | 1/2000 | Umeda et al. | 235/375 |
| 6,300,873 | B1 | * | 10/2001 | Kucharczyk et al. | 340/568.1 |
| 6,323,782 | B1 | * | 11/2001 | Stephens et al. | 340/825.31 |

FOREIGN PATENT DOCUMENTS

| | | |
|---|---|---|
| JP | 63-260506 | 11/1988 |
| JP | 05-287943 | 11/1993 |
| JP | 05-290051 | 11/1993 |
| JP | 09-032376 | 2/1997 |
| JP | 09-282531 | 10/1997 |
| JP | 9-330458 | 12/1997 |
| JP | 10-117917 | 5/1998 |

OTHER PUBLICATIONS

Japanese Office Action regarding Japanese Application 10–251049, dated Apr. 8, 2003. Translation enclosed.

* cited by examiner

*Primary Examiner*—William L. Miller
(74) *Attorney, Agent, or Firm*—Armstrong, Kratz, Quintos Hanson & Brooks, LLP

(57) ABSTRACT

In the case of parcels delivered by an automatic delivery system, all tenants in an apartment, etc., agree to receive parcels by a box; however, in the case of registered mails, in particular, registered mails with cash, some tenants do not agree to receive these from a delivery box because of fear of theft, etc. The resulting problem is that the delivery box is not used for delivering registered mails. A delivery box capable of handling a registered mail is provided with: a memory 22 for preliminarily memorizing kinds of registered mails that are not accepted by receivers, with respect to each of the receivers; a barcode reader **12*d* for reading electronic information of a registered mail; a judgment device 21 for making a judgment as to whether or not the kind of the registered mail read by the electronic information reader is permitted by a destination receiver as an acceptable mail; and a device for opening a lid 13** of a registered mail locker when the registered mail has been judged as an acceptable mail.

4 Claims, 5 Drawing Sheets

DELIVERY BOX CAPABLE OF HANDLING REGISTERED MAILS

BACKGROUND OF THE INVENTION

1. Field of the Invention

The present invention relates to a delivery box that is placed at the entrance of an apartment or a tenant building and that receives home delivery parcels, a delivery from a laundry, etc., even when the destination receiver is not at home, and allows the receiver to receive the goods when he or she has come home, and also concerns a delivery box capable of handling a registered mail which can store registered mails safely and manage them properly.

2. Description of the Related Art

An explanation will be briefly given of a conventional delivery box for receiving home delivery parcels, a delivery from a laundry, etc. When a destination receiver is not at home, a delivery man operates ten keys on the delivery box to enter the room number of the receiver, and since boxes that have no goods are displayed on the screen, the delivery man enters a box number of any box having no goods.

Next, when the parcel is put into the selected box and the door is closed, a receipt and a delivery certificate are issued by the printer; thus, the delivery man receives the receipt, and puts the delivery certificate into the corresponding mail post of the destination room number, thereby completing the delivery.

The receiver of the parcel, who has seen the delivery certificate in the mail post, inserts a card given to the receiver when became a tenant thereof into a card reader; then the door of the box containing the parcel opens, and after taking the parcel out, the door is closed, thereby completing the receiving process.

In the case of parcels delivered by the above-mentioned automatic delivery system, all the tenants in the apartment, etc., agree to receive parcels by means of such a box; however, in the case of registered mails, in particular, registered mails with cash, some tenants do not agree to receive these from the delivery box because off ear of theft, etc. The resulting problem is that the delivery box is not used for delivering registered mails.

SUMMARY OF THE INVENTION

The present invention has been devised to solve the above-mentioned problem, and its objective is to provide a delivery box capable of handling registered mails that allows the receivers to selectively receive registered mails depending on their desire, and also allows selective deliveries depending on the contents of registered mails, and the door of the box is designed to have a double structure so as to protect the contents from theft.

A delivery box capable of handling registered mails of the present invention, which has been devised to solve the above-mentioned objective, is provided with: a means for preliminarily memorizing kinds of registered mails that are not accepted by receivers, with respect to each of the receivers; an electronic information reading means for reading electronic information of a registered mail; a judgment means for making a judgment as to whether or not the kind of the registered mail read by the electronic information reading means is permitted by a destination receiver as an acceptable mail; and a means for opening a lid of a registered mail locker when the registered mail has been judged as an acceptable mail.

Moreover, in another aspect of the present invention, the delivery box is provided with: a means for preliminarily memorizing kinds of registered mails that are not accepted by receivers, with respect to each of the receivers; a means for identifying a mail man based upon whether or not a card possessed by the mail man is coincident with a pass number; an electronic information reading means for reading electronic information of a registered mail; a judgment means for making a judgment as to whether or not the kind of the registered mail read by the electronic information reading means is permitted by a destination receiver as an acceptable mail; and a means for opening a lid of a registered mail locker when the registered mail has been judged as an acceptable mail.

Furthermore, in other aspects of the present invention, the delivery box is designed so that, after the electronic information has been read, the name of the destination receiver is displayed so as to confirm the destination address, and is also designed so that the registered mail locker is provided with a plurality of divided rooms inside the lid, each of the divided rooms being provided with an inner lid so as to doubly ensure safety.

DESCRIPTION OF THE PREFERRED EMBODIMENTS

Referring to figures, the following description will discuss embodiments of a delivery box capable of handling registered mails of the present invention.

Figure 1:
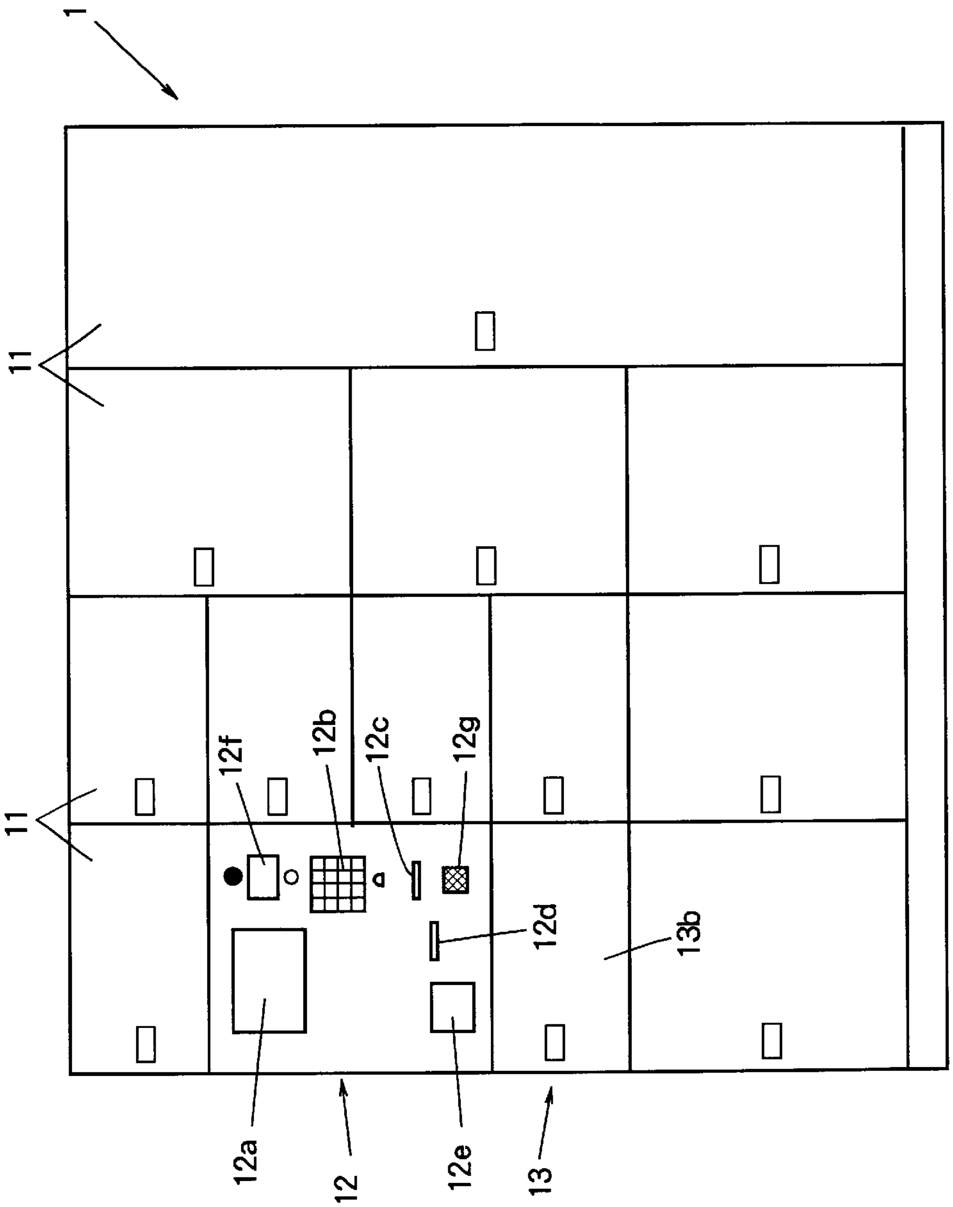
FIG. 1 is a front view that shows a delivery box capable of handling registered mails in accordance with the present invention.

FIG. 1 is a front view that shows the entire structure of a delivery box 1 in which a plurality of units 11 (four in the Figure) forming boxes having different sizes are laterally placed in succession.

An operation panel 12 is attached to one of the units 11, and a box 13 for storing registered mails is also attached thereto. On the operation panel 12 are placed a guiding screen 12*a* that shows a sequence of operations, etc., ten keys 12*b*, a card reader 12*c*, a barcode reader 12*d*, a printer 12*e* for issuing a receipt, a monitor 12*f*, a speaker 12*g*, etc.

Figure 2:
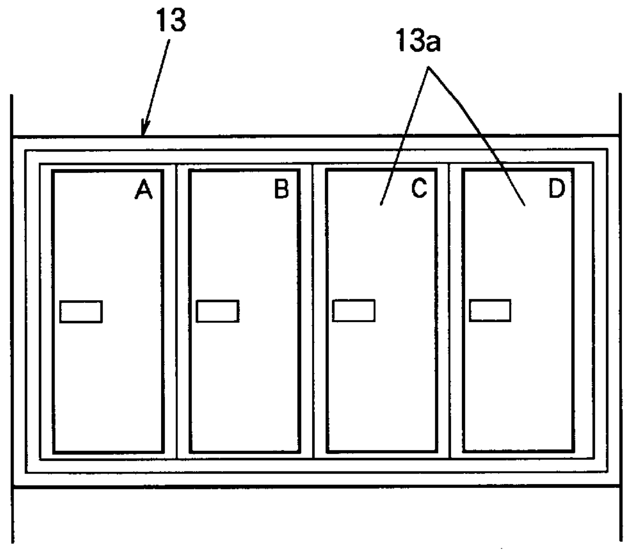
FIG. 2 is a front view that shows a state in which the outer lid of a registered mail box is opened.

As illustrated in FIG. 2, the box 13 for storing registered mails has four divisions inside thereof, and inner lids 13*a* are attached to the respective opening sections, and an outer lid 13*b* covering the entire opening sections is placed. Moreover, in each box 13, a first sensor (not shown) for detecting whether or not any registered mail is inserted and a second sensor (not shown) for detecting whether or not the inner lid 13*a* and the outer lid 13*b* are firmly closed are installed.

Figure 3:
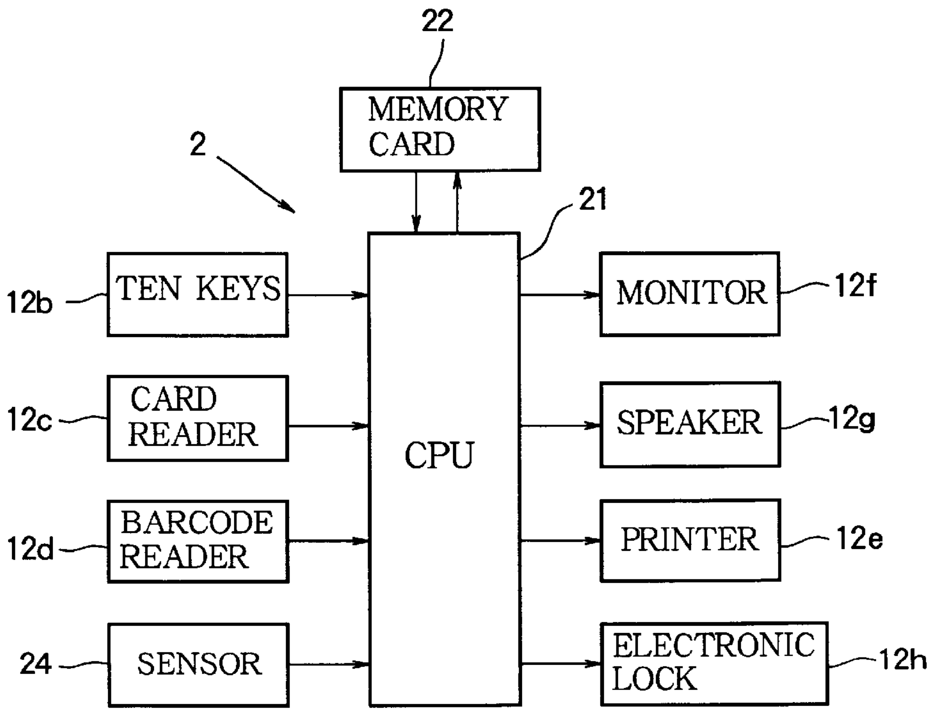
FIG. 3 is a block diagram that shows an electric circuit.

Next, referring to a block diagram of FIG. 3, an explanation will be given of a controlling circuit 2 for delivering a registered mail by the operation of the operation panel 12.

The controlling circuit 2 is constituted by a CPU 21 forming a central controlling unit and a memory card 22 for exchanging data with the CPU 21, as well as ten keys 12*b*, a card reader 12*c*, a barcode reader 12*d* and sensors 24 that consist of sensors for detecting whether or not any registered mail is inserted into the box 13 and sensors for detecting whether or not the inner lids 13*a* and the outer lid 13*b* are closed, which are placed on the input side of the CPU21, and connected through an interface, not shown.

Moreover, on the output side of the CPU 21 are placed a monitor 12*f* and a speaker 12*g* that provide a display showing a sequence of processes and a voice guidance each time an operation is carried out on the ten keys 12*b*, the card reader 12*c* and the barcode reader 12*d*, a printer 12*e* for outputting a receipt and a delivery certificate, and an electronic key 12*h* for opening the inner lid 13*a* and the outer lid 13*b* by using electric signals; and these devices are connected through an interface, not shown.

Figure 4:
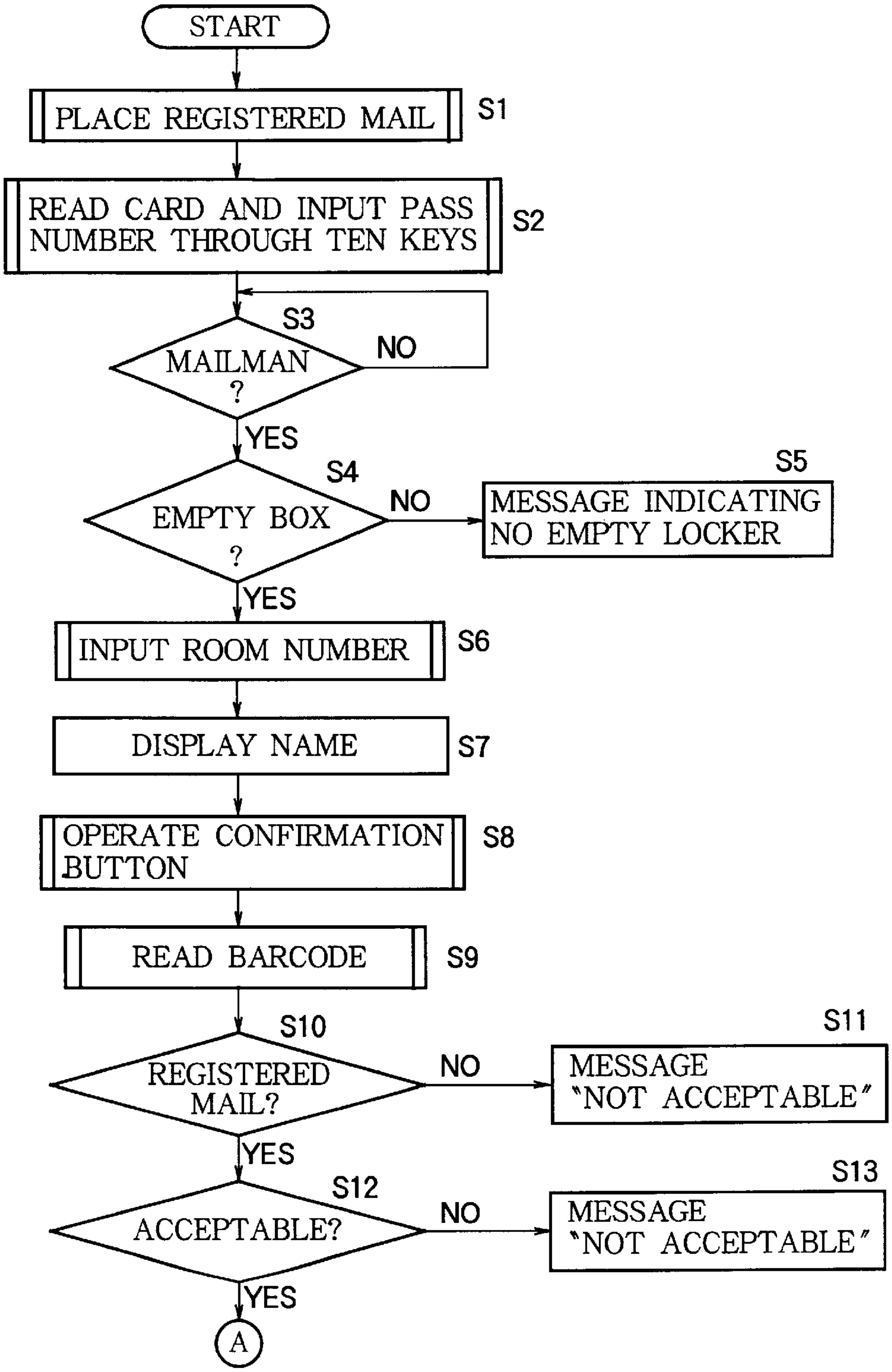
FIG. 4 is a flow chart that shows a delivering operation of a registered mail.
Figure 5:
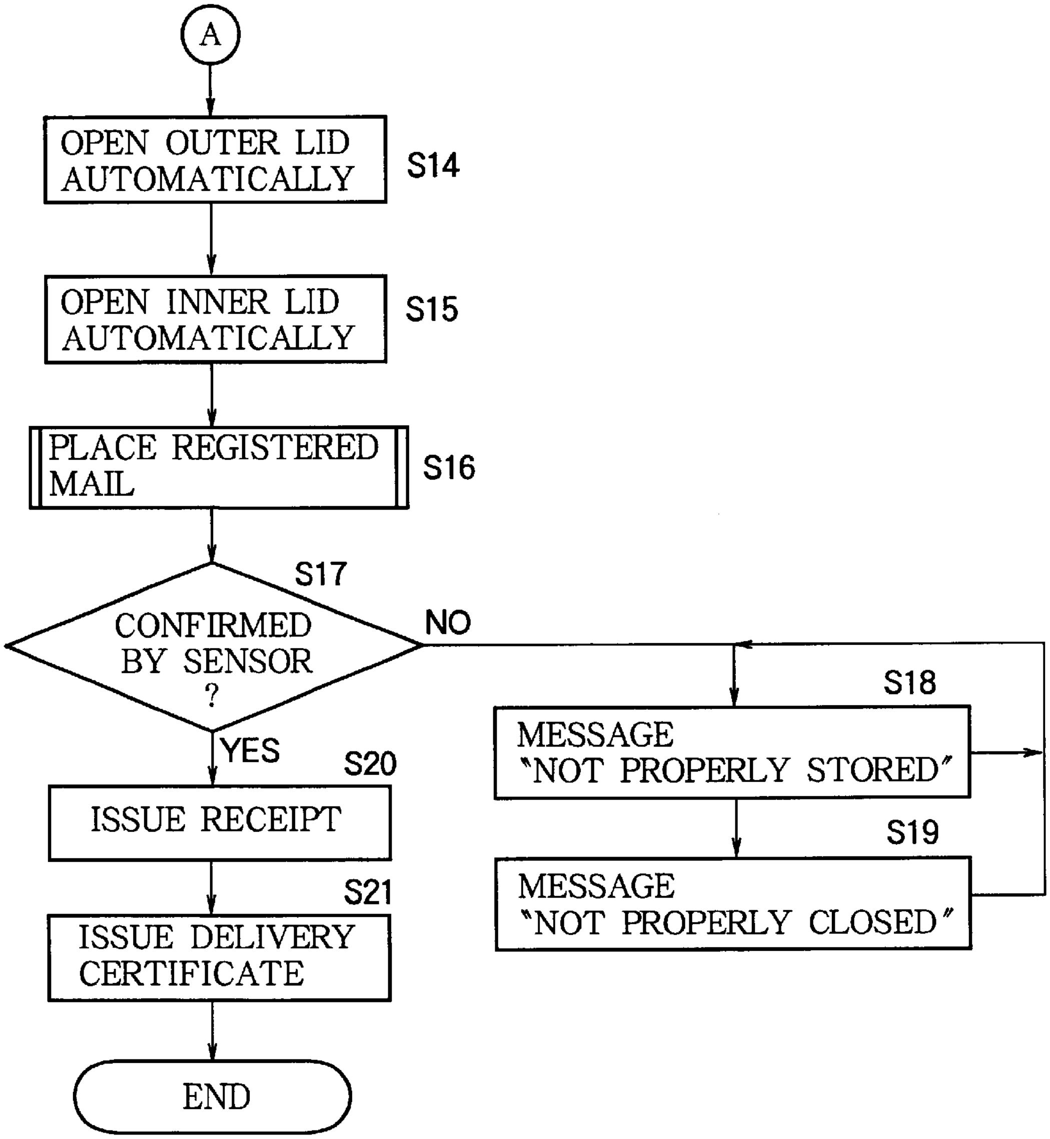
FIG. 5 is a flow chart that follows the above-mentioned flow chart.

Next, referring to flowcharts in FIGS. 4 and 5, an explanation will be given of the operation.

Registered mails include general, cash, recorded delivery, C.O.D. and simple registered mails, etc., and a barcode, put on the envelope of a registered mail, includes a type code indicating the type of the registered mail, an area code indicating an area such as Tokyo, Kanto, Shinetsu, Tokai, etc., a division code indicating an individual customer or a company, etc.

Here, in the case when some of receivers of mails in an apartment, etc., do not wish to receive, for example, cash registered mails among the registered mails through the delivery box, the room numbers of the corresponding receivers and the data indicating refusal of receiving cash registered mails are preliminarily stored in the memory card 22, and the names of the residents in the respective rooms are stored therein in association with the respective room numbers.

In this manner, in a state where various data have been preliminarily stored, when a mail man brings a registered mail and the destination receiver is not at home, the mail man operates the ten keys 12*b*, and selects the storage of a registered mail (step S1). Next, a card, which is possessed only by mailmen, is inserted into the card reader 12*c*, and inputs a pass number by operating the ten keys 12*b* (step S2). This operation is provided so as to allow only the mailmen to open the box 13 for registered mails, thereby preventing the mails from being stolen by a vicious deed and ensuring the safety of the mails.

Upon completion of the input of the pass number, a judgment is made as to whether or not the card and the password identify the mailman (step S3), and if the judgment shows that the mailman has been identified, the CPU 21 makes a judgment as to whether or not any box 13 is available for the mail storage (step S4), and if no empty box is available, the speaker 12*f* gives voice information to show that no box is available. (step S5).

In the above-mentioned step S2, if there is any empty box 13, the mailman operates the ten keys 12*b* to input the room number of the intended receiver (step S6) When the room number is inputted, the name of the resident corresponding to the room number, preliminarily stored, is displayed on the monitor 12*b* (step S7), and the mailman confirms the name, and if it is wrong, the mailman again operates the ten keys 12*b* to input the room number after having pressed a correct button.

Then, after confirming that there is no error, the mailman operates a confirmation key (step S8), and allows the barcode reader 12*d* to read the barcode put on the registered mail (step S9). The CPU 21, which has read the barcode, makes a judgment as to whether or not it is a registered mail (step S10), and if it judges that it is not a registered mail, it gives a warning through the speaker 12*f* to show that the mail is not acceptable (step S11).

Here, in the case when the barcode reader 12*d* has failed to read the barcode, the number placed together with the barcode can be inputted through the ten keys 12*b*.

When, based upon the barcode, the judgment shows that it is a registered mail, a judgment is made as to what kind of registered mail it is and whether or not the selected resident accepts the registered mail (step S12), and if it is not an acceptable registered mail, it gives a warning through the speaker 12*f* to show that the mail is not acceptable (step S13) In contrast, if it is an acceptable registered mail, the electronic key 12*h* opens the outer lid 13*b* of the box 13 (step S14), and the electronic key 12*h* also opens the inner lid 13*a*, and voice information is given to show that the box 13 has been opened (step S15) Thus, the mailman places the registered mail at a position inside the box 13 where a parcel sensor detects the mail, and closes the inner lid 13*a* and the outer lid 13*b* (step S16).

Then, the CPU 21 allows a parcel sensor 24 to detect the registered mail, and also allows a sensor 24 for detecting the open/close state of the lids to detect whether or not the inner lid 13*a* and the outer lid 13*b* have been positively closed (step S17). Here, if the parcel sensor 24 fails to detect the registered mail or if the lid sensor 24 fails to detect the closed state of the lids, voice information is given to show the state (step S18), and the mailman again places the mail properly, and again closes the inner and outer lids 13*a* and 13*b* (step S19).

At step S18, if it is confirmed that the mail has been placed at the right position and that the inner and outer lids 13*a* and 13*b* have been positively closed, the printer 12*e* issues a receipt to be taken by the mailman (step S20) and a delivery certificate to be put into the mail post of the destination receiver (step S21). Thus, the mailman puts the delivery certificate into the post, thereby completing the mailing process of the registered mail.

Figure 6:
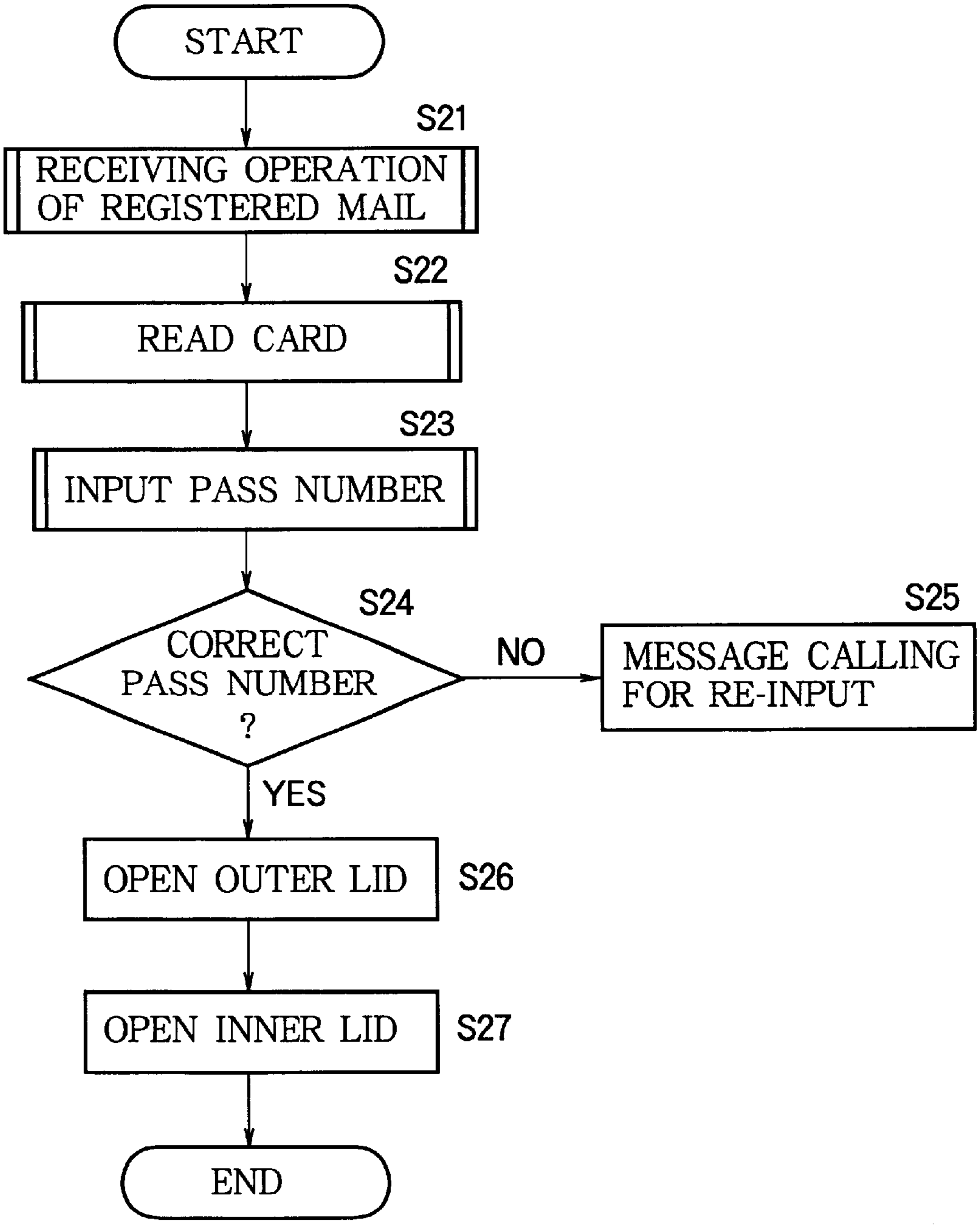
FIG. 6 is a flow chart that shows a receiving operation of a registered mail.

Next, referring to FIG. 6, an explanation will be given of the operation of the resident who receives the registered mail.

The resident, who has seen the delivery certificate, operates the ten keys 12*b* to make a selection to receive the registered mail (step S21). Next, the resident inserts his or her own parcel-receiving card into the card reader 12*c* (step S22). Here, the CPU 21 makes a judgment as to whether or not the registered mail is present (step S23), and if no registered mail exists, it gives voice information through the speaker 12*f* to show the fact (step S23).

In the case when no voice information is given with the registered mail being placed, the resident inputs a registered pass number through the ten keys 12*b* (step S23). Here, a judgment is made as to whether or not the pass number is correct (step S24), and if it is wrong, information is given so as to call for the correct pass number; and if there are four miss inputs, an instruction for making the corresponding card invalid is sent to the RAM 22 (step S25).

At the step S24, when the judgment shows that the inputted pass number is correct, the outer lid 13*b* of the box 3 is released (step S26), and the inner lid 13*a* thereof is also released (step S27); therefore, after taking the registered mail out, the inner and outer lids 13*a* and 13*b* are closed, thereby completing the receiving process of the registered mail.

Here, with respect to the above-mentioned receiving operation of the registered mail, the explanation has been given of the case in which only the registered mail is handled; however, in the case when the same operation is carried out at the time of receiving general parcels (home delivery service), after the step S22, a judgment is made as to whether or not any parcel exists, and if there is no parcel, information is given to show this fact.

In the above embodiment, the place of delivery is explained as being a delivery box capable of handling registered mails. It is to be noted, in this connection, that such delivery boxes are set up not only on the premises of a condominium but also at any public facilities such as a railway station or the like.

Next, if there is any parcel, the lid of a locker where the parcel is housed is opened, and a judgment is made as to whether or not any registered mail exists, and if there is any registered mail, information is given to call for the pass word, and the sequence proceeds to the step S23, thereby making it possible to receive the registered mail.

Here, in the above-mentioned embodiment, all the managing information including the delivering and receiving information of parcels and registered mails maybe transferred to the central control room through lines so that quick responding operations and positive managing operations can be carried out, and monitoring cameras and audio transmitting and receiving devices may be set so that a real-time monitoring operation is carried out so as to prevent and readily deal with any accident or theft.

As described above, the information as to whether or not each receiver such as a resident accepts any of registered mails depending on the kinds thereof has been preliminarily stored, and depending on the kind of registered mails put on the barcode inserted by the mailman, a judgment is made as to whether or not the corresponding registered mail is an acceptable registered mail, and the delivery is controlled; therefore, the receivers can easily receive registered mail through the delivery box safely.

Moreover, since the delivery is accepted based upon the card and pass number the mailman carries with him, no person other than the mailmen can open the registered mail box. Thus, it is possible to prevent any theft made by anyone other than the resident and mailmen, and since the name of the corresponding resident is displayed at the time of the input of the room number by the mailman, it is possible to prevent miss delivery to another resident. Furthermore, since the inner lids are attached to the plurality of divided boxes, it is possible to prevent the boxes from being opened with evil intent.

What is claimed is:

1. A computerized controlled delivery box capable of handling registered mail, comprising:

program means capable of preliminarily memorizing kinds of registered mail that are not acceptable to a receiver;

electronic information reading means for reading electronic information of the registered mail;

judgment means for making a first judgment that is made as to what kind of registered mail it is, and a second judgement based on the memorized kinds of the registered mail as to whether the read electronic information does not match with any of the memorized kinds of the registered mail and thus is acceptable by the receiver; and means for opening a lid of a registered mail locker of the delivery box when the read electronic information has been judged as corresponding to the registered mail that is acceptable to the receiver.

2. A computerized controlled delivery box capable of handling registered mails comprising:

program means capable of preliminarily memorizing kinds of registered mail that are not acceptable to a receiver;

identifying means for identifying a mail man based upon whether or not a card possessed by the mail man is coincident with a pass number;

electronic information reading means for reading electronic information of the registered mail;

judgment means for making a first judgment that is made as to what kind of registered mail it is, and a second judgement based on the memorized kinds of the registered mail as to whether the read electronic information does not match with any of the memorized kinds of the registered mail and thus is acceptable by the receiver; and means for opening a lid of a registered mail locker of the delivery box when the read electronic information has been judged as corresponding to the registered mail that is acceptable to the receiver.

3. A delivery box capable of handling registered mail according to either claim 1 or claim 2, wherein after the electronic information has been read, a name of the receiver designated on the registered mail is displayed on a monitor so as to confirm an address of the receiver designated on the registered mail.

4. A delivery box capable of handling registered mail according to either claim 1 or claim 2, wherein the registered mail locker is provided with a plurality of divided rooms inside the lid, each of the plurality of divided rooms being provided with an inner lid so as to doubly ensure safety.

* * * * *